(12) United States Patent
Kong

(10) Patent No.: US 7,778,754 B2
(45) Date of Patent: Aug. 17, 2010

(54) METHOD AND SYSTEM FOR PREVENTING MIXING OF MATERIALS IN TWO-SHOT MOLDING FOR PRODUCTION OF CRASH PAD

(75) Inventor: Byung Seok Kong, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 206 days.

(21) Appl. No.: 11/961,044

(22) Filed: Dec. 20, 2007

(65) Prior Publication Data

US 2009/0043454 A1 Feb. 12, 2009

(30) Foreign Application Priority Data

Aug. 7, 2007 (KR) ...................... 10-2007-0079075

(51) Int. Cl.
*B60R 22/00* (2006.01)
(52) U.S. Cl. ........................................................ 701/45
(58) Field of Classification Search .................. 701/45; 180/271
See application file for complete search history.

(56) References Cited

U.S. PATENT DOCUMENTS 6,344,249 B1 * 2/2002 Maruyama et al. ......... 428/34.1
2008/0230937 A1 * 9/2008 Bader ........................ 264/40.6

FOREIGN PATENT DOCUMENTS

JP 8-20040 A 1/1996
JP 2001-179780 A 7/2001

\* cited by examiner

*Primary Examiner*—Kim T Nguyen
(74) *Attorney, Agent, or Firm*—Morgan, Lewis & Bockius LLP

(57) ABSTRACT

Disclosed is a method and system for preventing mixing of materials upon two-shot molding for the production of a crash pad, in which, in the course of the production of a crash pad through the simultaneous injection of two types of resins, the penetration of one type of resin into the region of the crash pad, which is filled with another type of resin, is effectively prevented by a flow-retarding dam that is formed at a portion of an injection mold which is positioned outside the passenger-side airbag door region.

7 Claims, 5 Drawing Sheets

(a)

(b)

METHOD AND SYSTEM FOR PREVENTING MIXING OF MATERIALS IN TWO-SHOT MOLDING FOR PRODUCTION OF CRASH PAD

CROSS REFERENCE TO RELATED APPLICATIONS

This application claims priority to Korean Application No. 10-2007-0079075, filed on Aug. 7, 2007, the disclosure of which is incorporated herein by reference

BACKGROUND OF THE INVENTION

1. Field of the Invention

The present invention relates to a method and system for preventing mixing of materials, in which, in the course of the production of a crash pad through the simultaneous injection of two different types of resins, the penetration of one type of resin into the region of the crash pad, which is filled with another type of resin, is effectively prevented.

2. Description of the Related Art

Generally, a crash pad is mounted onto the front of the interior of an automobile, where a steering wheel and an instrument panel are located.

Such a crash pad is conventionally manufactured by subjecting one type of synthetic resin to injection molding using a mold. Further, because an airbag is provided these days to the passenger seat of an automobile, a PAB (Passenger-side Airbag) door for use in the inflation of the airbag is defined by a laser-processed tear line at the portion of the crash pad where the passenger-side airbag is mounted. Recently, through two-shot molding, that is, the simultaneous injection of two different types of resins, the portion of the crash pad to which the passenger-side airbag is mounted, including the PAB tear line, is formed using a highly soil material, thereby producing a crash pad which allows the PAB door to be more easily opened.

Generally, examples of the first material for the entire crash pad include PPF (PolyPropylene fiber) resin, having high hardness, and examples of the second material, which is charged in the PAB door region, include TPO (ThermoPlastic Olefin) resin or TPE (ThermoPlastic Elastomer) resin, having high softness.

However, when two different materials are used to produce a crash pad, the different materials mix at the boundary thereof, undesirably making the strength of the tear line of the PAB door region non-uniform, resulting in irregular breakage of a PAB door upon the expansion of an airbag, which is regarded as a serious defect that compromises the safety of a passenger.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

According to a first embodiment of the present invention, there is provided a method of preventing the mixing of materials, suitable for the integral formation of a PAB door region made of a second material, having high softness, and portions of the crash pad other than the PAB door region, made of a first material having high hardness, through two-shot molding, thus producing a crash pad, the method including forming a flow-retarding dam at the portion of an injection mold which is positioned outside the PAB door region and at the boundary portion which the mixing of the first material and the second material occurs, to decrease the thickness of the predetermined portion of the crash pad, thus retarding the flow of the first material and promoting the solidification thereof.

Among the (outer) boundary portions of the PAR door region, filled with the second material, any boundary portion in which the first material flows rapidly is mainly provided with the flow-retarding dam. Usually as soon as the first material, flowing rapidly, is brought into contact with the second material these materials are vigorously stirred, which induces the mixing of the materials. Hence, a flow-retarding dam is formed at this boundary portion in order to prevent the penetration of the first material into the PAB door region wherein the second material exists. The location and position of the flow-retarding dam is determined through multiple tries and errors, and may vary depending on the shape and type of the crush pad.

In order to decrease the thickness of the predetermined portion of the crash pad at the boundary portion of the first and second materials, the flow-retarding dam is manufactured in a configuration in which the height of the injection mold at the above-commented boundary portion is increased. When the flow-retarding dam is provided to thus make the boundary portion of the crash pad thin, the flow of the first material is relatively reduced slowly. In such a course, the first material is sufficiently solidified due to the rime delay, therefore resulting in less mixing of the first material and the second material at the boundary portion. Consequently, the penetration of the first material into the PAB door region, which is filled with the second material, may be prevented.

However as the thickness of the crash pad is decreased, the rigidity thereof is relatively weakened. This problem may be solved through various methods, including subjecting the corresponding boundary portion to additional reinforcement as known to the ordinary person in the art.

According to a second embodiment of the present invention, a plurality of sensing means is provided at the injection mold inside the PAB door region to sense the penetration of the first material, and a controller is provided to output control signals to the first material feeder, in response to the sensed signals monitored from the sensing means for decreasing the flow rate or temperature of the first material in the corresponding boundary portion.

During the injection molding, the pure first material, the mixture of first material and second material, and the pure second material have different rates, pressures, and viscosities respectively. The sensing means able to sense the flow difference, especially the pressure difference is mounted to many inner portions of the PAB door region, thus sensing the penetration of the first material. When the sensing means senses the penetration of the first material based on the flow difference, the signals thus sensed are transmitted to the controller, after which the controller outputs control signals to control the first material feeder, so as to decrease the flow rate or temperature of the first material which is to be fed to the portion of the PAB door region, at which the sensing means, having sensed whether the first material is penetrated, is positioned.

When the flow rate of the first material is decreased, the solidification of the first material is promoted for those delayed time, thus enabling the prevention or reduction of the mixing of the first material with the second material. Further, when the temperature of the first material is decreased, the viscosity is increased and the flow rate of the first material is decreased, thus playing the same effect.

The plurality of sensing means may be mounted so as to be uniformly distributed in the PAB door region. Alternatively, the plurality of sensing means may be intensively mounted to any portion of the PAB door region, in which the penetration of the first material mainly occurs, found through multiple trials and errors. The position of the sensing means may vary depending on the shape of the crash pad.

To easily distinguish the difference in the flow between the first material and the second material, the pressure of each flow is measured. Thus, it is preferred that the sensing means be a pressure sensor for sensing the flow pressures of the first material and the second material. Specifically, the sensing of the flow pressure difference of each material is mentioned below in detail with reference to FIGS. 4 and 5.

In addition, a system for conducting the method of preventing the mixing of materials according to the present invention includes an injection mold having the shape corresponding to a crash pad and having a flow-retarding dam for decreasing the thickness of the predetermined portion of the crash pad, at which a first material and a second material are mixed, a first material feeder for feeding the first material into the injection mold along a plurality of feed lines, a second material feeder for feeding the second material into the injection mold of PAB door region along a single feed line, a plurality of sensing means provided at the injection mold inside the PAB door region in order to sense the penetration of the first material, and a controller for outputting signals for controlling the flow rate or temperature of the first material to the first material feeder, in response to the sensed signals input from the sensing means.

BRIEF DESCRIPTION OF THE DRAWINGS

The above and other features of the present invention will now be described in detail with reference to certain exemplary embodiments thereof illustrated the accompanying drawings, which are given by way of illustration only, and thus are not limitative of the present invention, and wherein.

Figure 1:
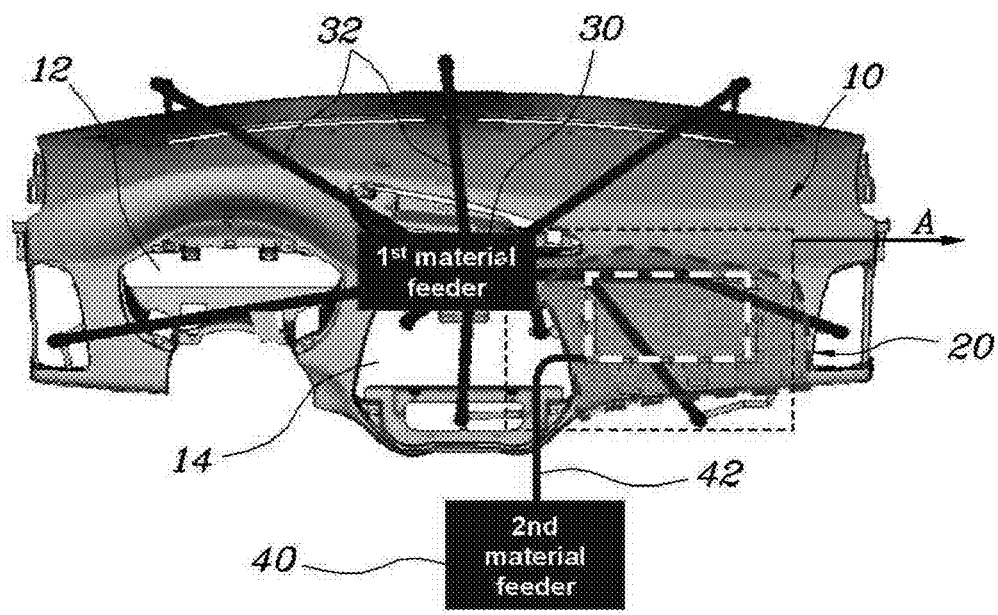
FIGS. 1A and 1B are views illustrating the process of preventing the mixing of materials in the two-shot molding, according to a first embodiment of the present invention.
Figure 1:
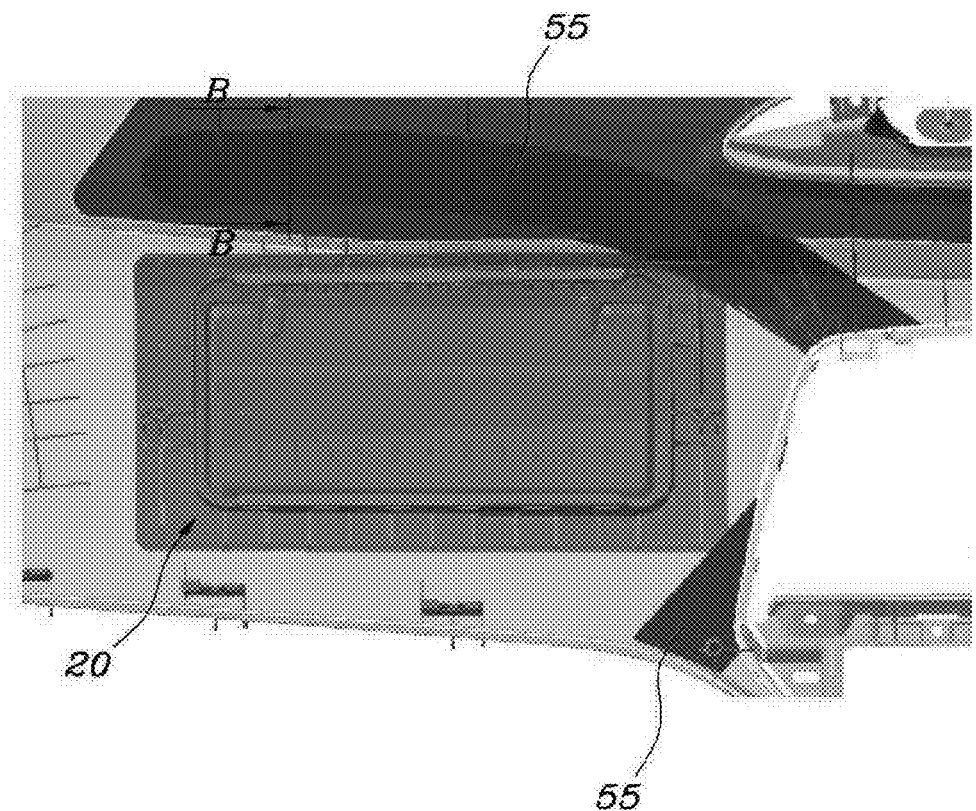

However, it should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF THE PREFERRED EMBODIMENTS

Reference will now be made in detail to a preferred embodiment of the present invention, an example of which is illustrated in the accompanying drawings and described below. While the invention will be described in conjunction with an exemplary embodiment, it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

FIGS. 1A and 1B illustrate the formation and position of a flow-retarding dam 55, which is a technical feature of the present invention, to prevent the mixing of materials. As illustrated in FIG. 1, the crash pad 10 is composed of a seat having a complicated shape, the left of which includes a portion 12 where a steering wheel is mounted, the lower center of which includes a portion 14 where various instruments are mounted, and the right of which includes a PAB door region 20 where a passenger-side airbag is mounted. A two-shot molding machine includes a first material feeder 30 for feeding a PPF resin for the entire crash pad, a plurality of first material feed lines 32, a second material feeder 40 for feeding a TPO resin for a PAB door region 20, and a single second material feed line 42.

The flow-retarding dam 55, which is a technical feature or the present invention, is well illustrated in FIG. 1B, in which the back surface of the predetermined portion A of the PAB door region 20 of the crash pad 10 of FIG. 1A is enlarged. The flow-retarding dam 55 is formed at at least two portions, in which the flow of the PPF resin, serving as the first material, is fast, rather than outer portions of the PAB door region 20. In this case, one flow-retarding dam positioned near to the upper portion of the PAB door region 20 is formed long in a transverse direction on the PAB door region 20, and another flow-retarding dam is formed near to the lower right portion of the PAB door region 20.

The position of the flow-retarding dam 55 may be located where the PPF resin, i.e., the first material, penetrates into the PAB door region 20 due to the fast flow thereof, determined through multiple trials and errors, and the actual position thereof may vary depending on the shape and type of the crash pad, as mentioned above.

Figure 2A:
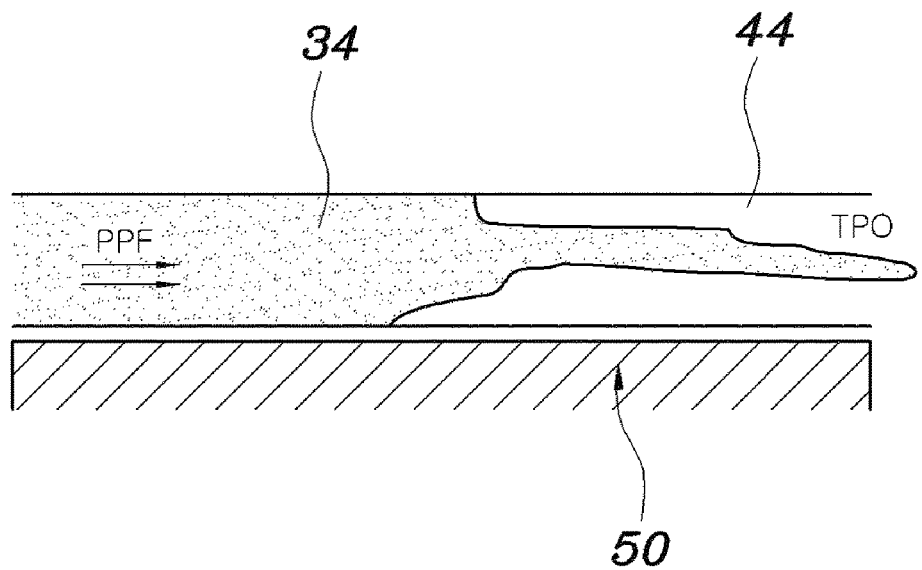
FIGS. 2A and 2B are sectional views respectively illustrating the conventional process and the process of FIGS. 1A and 1B according to the present invention for comparison.
Figure 2B:
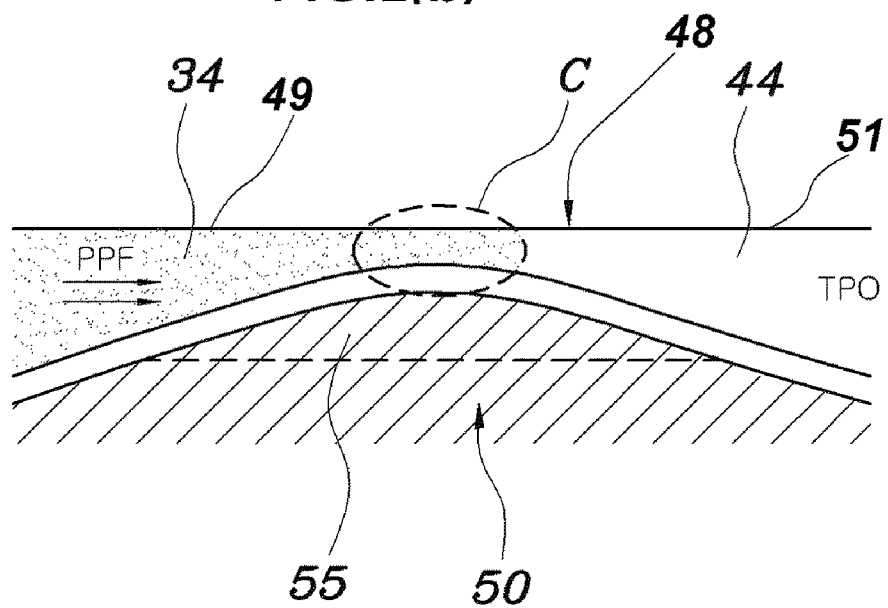

FIGS. 2A and 2B are sectional views illustrating the conventional mold (FIG. 2A) and the mold (FIG. 2B) of the present invention ken along the line B-B of FIG. 1B for comparison. As illustrated in FIG. 2A, since a conventional injection mold in which the flow of the first material is uniform, the flow of PPF resin having high flowability is faster than the flow of the second material, i.e., the TPO resin 44, the PPF resin 34 is penetrated into the boundary of the TPO resin 44, having low flowability, before being solidified, thus making the boundary of the PAB door region non-uniform.

In brief, when two different materials are used to produce a crash pad, those materials are mix at the boundary thereof, undesirably making the strength of the tear line of the PAB door region non-uniform, resulting in irregular breakage of a PAB door upon the expansion of an airbag, which is regarded as a serious detect that compromises the safety of a passenger.

However, in contrast, as illustrated in FIG. 2B according to an exemplary embodiment of the present invention, since the injection mold 50, having the flow-retarding dam 55 protrusively-formed in a cavity 48 of the injection mold 50 to increase the height of the injection mold and form a first part 49 and a second part 51 therein, is applied to a location where the flow of PPF resin is fast and thus the thickness of the corresponding boundary portion of the crash pad is decreased, the flow rate of the PPF resin 34 is decreased. During those time delay, the PPF resin 34 is sufficiently solidified at the solidification-promoting part C formed at the boundary portion of the crash pad where the PPF resin 34 is brought into contact with the TPO resin 44. Consequently, the PPF resin 34 does not penetrate into the TPO resin 44, thus making it possible to fill the PAB door region with the TPO resin alone.

Wherefore, the uniform boundary between the first material and the second material results in uniform breakage of a PAB door along the commented boundary portion upon the expansion of an airbag, which promotes normal expansion of the airbag. Thus, in a car crash, an airbag may be safely and rapidly expanded to protect a passenger from the danger of an injury.

Figure 3:
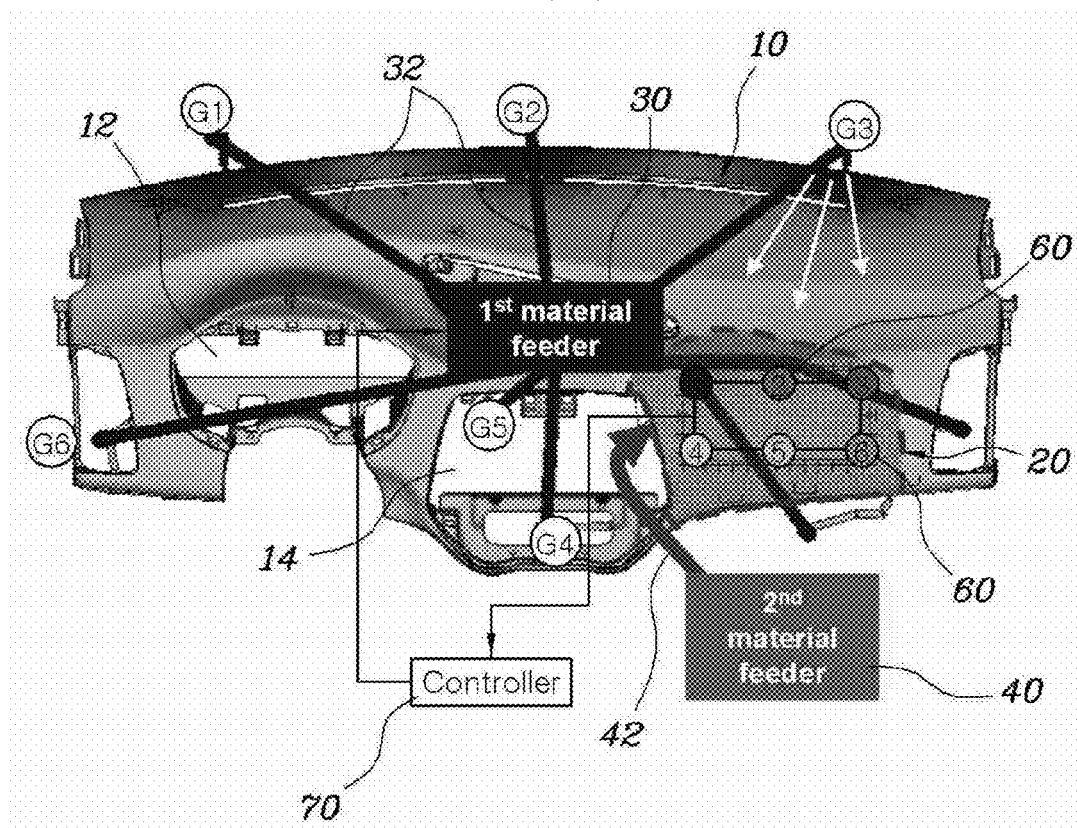
FIG. 3 is a view illustrating the process of preventing the mixing of materials in the two-shot molding, according to a second embodiment of the present invention.

FIG. 3 illustrates another exemplary embodiment of the present invention having six pressure sensors, provided as the sensing means 60 for preventing the mixing of the materials of PPF resin and TPO resin. For example, the first material feeder 30 for feeding the PPF resin may include eight first material feed lines (G1~G8, 32) over the crash pad 10, and the second material feeder 40 for feeding the TPO resin includes a single second material feed line 42 at at least a side of the PAB door region 20.

In the PAB door region 20, six pressure sensors are uniformly distributed as the sensing means 60 for monitoring the flow difference of the PPF resin and TPO resin. Alternatively, as mentioned above, the sensing means 60 may be intensively provided at a location where the penetration of the PPF resin mainly occurs. Further, the controller 70 is connected to output necessary control signals to control the first material feeder 30, in response to the sensed signals input from the six pressure sensors 60.

Figure 4:
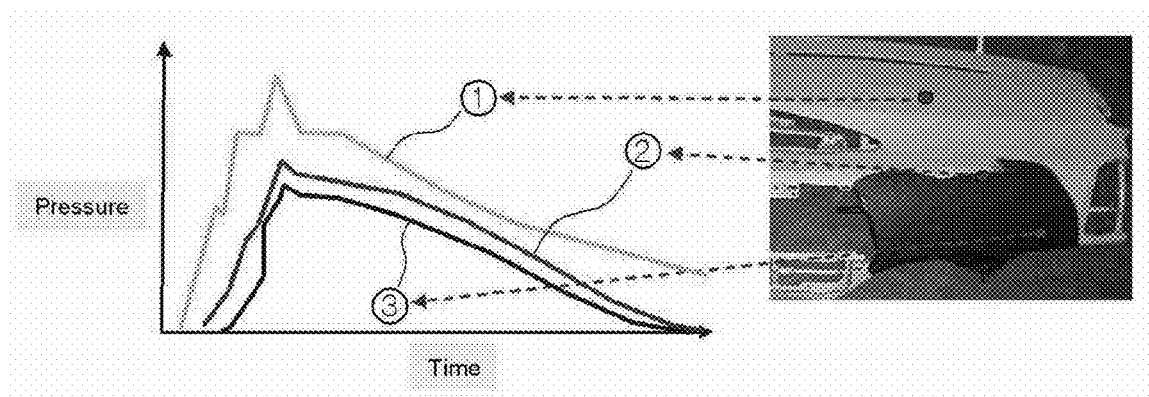
FIGS. 4 and 5 are graphs illustrating the conditions for the process of FIG. 3.
Figure 5:
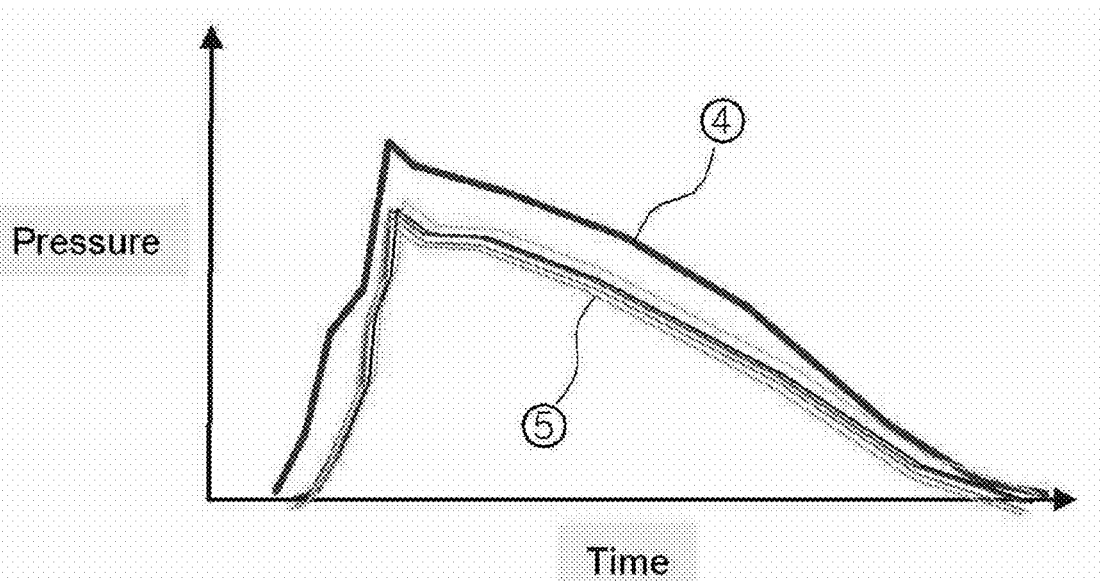

FIGS. 4 and 5 are graphs illustrating the conditions for the process of FIG. 3 according to the present invention.

As illustrated in the graph of FIG. 4, during the process of injection molding, the flow pressure (①) of pure PPF resin, the flow pressure (②) of the mixture of PPF resin and TPO, and the flow pressure (③) of pure TPO resin are different from each other. Because the PPF resin, having high flowability, has higher flow pressure than the TPO resin, having low flowability, the flow pressure is represented by the sequence of (①)→(②)→(③) in the above three cases.

In an exemplary embodiment of the present invention, in the course of the two-shot molding, when the PPF resin, i.e., the first material penetrates into the PAB door region 20 due to the high flow rate of the PPF resin fed from the third feed line G3 among the eight first material feed lines 32, the second pressure sensor, adjoining the third feed line, may sense pressures similar to the flow pressure (④) of the mixture of PPF resin and TPO resin, and the other pressure sensors sense pressures showing the flow pressure (⑤) of only the TPO resin, as graphically illustrated in FIG. 5 unless the PPF resin penetrates into the PAR door region 20.

The second pressure sensor transmits the sensed signals to the controller 70, after which the controller 70 outputs the control signals to the first material feeder 30, in response to the sensed signals input thereto, thus delaying the feed timing of the PPF resin or decreasing the temperature in a hot runner, thereby decreasing the flow rate of the PPF resin from the third feed line G3 or the temperature thereof.

Thereafter, the controller 70 allows a worker to recognize the penetration of the PPF resin using an additional display device, in order to detect defective products. Also, through feedback of each feed line, the generation of similarly defective products is prevented in the subsequent process.

The preferred embodiments of the present invention have been disclosed through two-shot molding mainly using PPF resin and TPO resin as two materials of a crash pad which is actually applied to automobiles, but are not limited thereto. Cases of two-shot molding using, other materials are also intended to be included in the technical spirit of the present invention, as long as the same technical construction as that of the present invention is applied thereto.

As described above, the present invention provides a method and system for preventing mixing of materials in the two-shot molding for the production of a crash pad. According to the present invention, in the crash pad, the penetration of a different material into a PAB door region, where a passenger-side airbag is mounted, is prevented, thereby making the strength of the PAB tear line uniform, to thus promote normal expansion of the airbag. Thus, in the event that an automobile impact accident occurs, an airbag may be safely and rapidly expanded to protect a passenger from the danger of an injury.

What is claimed is:

1. A method of preventing mixing of materials in two-shot molding where a cavity is formed in an injection mold for production of a crash pad, suitable for integral formation of a passenger-side airbag door region made of a second material having high softness and portions of the crash pad other than the passenger-side airbag door region, made of a first material having high hardness, through two-shot molding, to produce the crash pad, the method comprising:

forming a flow-retarding dam at a portion of the cavity in the injection mold which is positioned outside the passenger-side airbag door region, wherein the cavity includes a first part and a second part divided by the flow-retarding dam, injecting the second material into the second part of the cavity that corresponds to the passenger-side airbag door region; and injecting the first material into the first part of the cavity that corresponds to other than the passenger-side airbag door region, wherein the injecting of the first material into the first part of the cavity and the second material into the second part of the cavity is performed simultaneously; and wherein a thickness of a predetermined portion of the crash pad that is made by the flow-retarding dam, by which the first part of the cavity and the second part of the cavity are divided, is decreased, and thus retarding flow of the first material in the predetermined portion and promoting solidification of the first material in the redetermined portion is accomplished.

2. The method as set forth in claim 1, wherein at least a sensing means is provided at the injection mold inside the passenger-side airbag door region to sense penetration of the first material, and a controller is provided to output control signals to a first material feeder to decrease a flow rate or temperature of the first material of the corresponding portion, in response to the sensed signals input from the sensing means.

3. The method as set forth in claim 2, wherein the sensing means is a pressure sensor for sensing flow pressure of the first material and the second material.

4. The method as set forth in any one of claims 1 to 3, wherein the first material is a polypropylene fiber resin, and the second material is a thermoplastic olefin resin or thermoplastic elastomer resin.

5. A system for preventing mixing of materials in two-shot molding for production of a crash pad, suitable for integral formation of a passenger-side-airbag (PAB) door region made of a second material having high softness and portions of the crash pad other than the PAB door region, made of a first material having high hardness, through two-shot molding, to produce the crash pad, the system comprising:

an injection mold having a shape corresponding to a crash pad and having a flow-retarding dam in a cavity thereof for decreasing a thickness of a predetermined portion of the crash pad, at which the first material and the second material are mixed, wherein the cavity includes a first part and a second part divided by the flow-retarding dam;

a first material feeder for feeding the first material into the first part of the cavity along at least a feed line;

a second material feeder for feeding the second material into the second part of the cavity along at least a single feed line;

at least a sensing means provided at the injection mold inside the passenger-side airbag door region to sense penetration of the first material; and a controller for outputting signals for controlling a flow rate or temperature of the first material to the first material feeder, in response to sensed signals input from the sensing means.

6. The system as set forth in claim 5, wherein the sensing means is a pressure sensor for sensing flow pressure of the first material and the second material.

7. The system as set forth in claim 5 or 6, wherein the first material is a polypropylene fiber resin, and the second material is a thermoplastic olefin resin or thermoplastic elastomer resin.

* * * * *